United States Patent [19]

Adasch et al.

[11] Patent Number: 5,194,204

[45] Date of Patent: Mar. 16, 1993

[54] PROCESS FOR PRODUCING A SILICIZED SILICON CARBIDE DIPPING FORMER

[75] Inventors: Gunter Adasch, Marktredwitz; Jürgen Huber, Selb, both of Fed. Rep. of Germany

[73] Assignee: Hoechst CeramTec Aktiengesellschaft, Selb, Fed. Rep. of Germany

[21] Appl. No.: 472,250

[22] Filed: Jan. 30, 1990

[30] Foreign Application Priority Data

Feb. 1, 1989 [DE] Fed. Rep. of Germany ....... 3902936

[51] Int. Cl.$^5$ .............................................. C04B 35/64
[52] U.S. Cl. ......................................... 264/63; 264/86; 264/227; 427/294
[58] Field of Search ................... 264/63, 86, 227, 309; 427/294; 425/269, 275

[56] References Cited

U.S. PATENT DOCUMENTS

| | | | |
|---|---|---|---|
| 2,941,277 | 6/1960 | Ganz | 264/227 |
| 3,495,939 | 2/1970 | Forrest | 264/65 |
| 4,127,629 | 11/1978 | Weaver et al. | 264/63 |
| 4,238,434 | 12/1980 | Enomoto et al. | 264/63 |
| 4,329,312 | 5/1982 | Ganz | 264/309 |
| 4,477,493 | 10/1984 | Parkinson et al. | 264/56 |
| 4,514,346 | 4/1985 | Luhleich et al. | 264/63 |
| 4,572,848 | 2/1986 | Pollak et al. | 427/294 |
| 4,957,811 | 9/1990 | Benker et al. | 423/345 |

FOREIGN PATENT DOCUMENTS 147478 7/1985 European Pat. Off. .
1596303 8/1981 United Kingdom .

Primary Examiner—Jay H. Woo
Assistant Examiner—Robert B. Davis
Attorney, Agent, or Firm—Foley & Lardner

[57] ABSTRACT

A process for making a ceramic dipping former from silicized silicon carbide by making an absorbent negative mold of the ceramic dipping former containing preparing a suspension containing at least two particle size fractions of silicon carbide, a binder and water and pouring the suspension into the absorbent negative mold, drying the suspension in the absorbent negative mold, opening the absorbent negative mold and removing a silicon carbide green body, and further drying and silicizing the green body in a drying oven at a temperature between approximately 1400° C. to 1750° C. under reduced pressure.

3 Claims, No Drawings

PROCESS FOR PRODUCING A SILICIZED SILICON CARBIDE DIPPING FORMER

The invention relates to ceramic dipping formers made from materials of high thermal conductivity and to a process for the production of ceramic dipping formers from SiSiC.

Under the present state of technology, the manufacture of thin-walled, dip-formed vinyl products employs dipping formers made from aluminum. However, the use of aluminum formers has a number of drawbacks. Thus, the surface becomes rapidly corroded in use by the suspension polymer employed and by the cleansing action, necessary at given intervals, of corrosive alkaline or acid cleansing agents.

In addition, aluminum and its alloys are relatively soft, which makes the surface of the dipping formers more liable to scratching. Unavoidable mechanical stresses of the production line give rise to scratches and indentations on the surface of the former. Formers damaged in this way can no longer be used to produce articles free from defects.

The use of dipping formers made from porcelain for the manufacture of latex products has been known for a long time. The external shape of the dipping formers used in the manufacture of gloves can be found, for example, in the Applicant's technical brochure "Dipping Formers" (02L0886).

However, porcelain does not possess the high thermal facture of vinyl gloves which is about 100 to 200 W/mK depending on the alloy.

We have now found that the drawbacks of the dipping formers made from aluminum or porcelain used hitherto can be overcome if silicon-infiltered silicon carbide (SiSiC), silicon carbide sintered without pressure (SSiC), aluminum nitride (AlN) or beryllium oxide (BeO) are employed. The thermal conductivity of these materials is virtually the same as, or even higher than, that of aluminum. The use of dipping formers made from these materials makes certain that the gelling process (vulcanization) of polyvinyl chloride on the dipping formers can take place at temperatures in the proximity of about 300° C. and that only a very brief time of exposure to these temperatures is required.

A further advantage of the ceramic materials referred to above is their great hardness compared with aluminum and their high resistance to wear and corrosion. The density of these materials (2.8 to 3.1 g/cm³) lies in the range of aluminum alloys (2.6 to 2.9 g/cm³), so that the dipping formers according to the invention are only slightly heavier than those made from porcelain or aluminum.

If dipping formers made from conventional porcelains with their distinctly lower thermal conductivity are used, no uniform heating up of the former across the entire surface occurs during the time of exposure preset by the machine cycle. The result is that the dip-formed product, for example a glove, present as a thin layer on the former is scorched in some places, yet is incompleted remains tacky.

The geometrical shape of the desired dip-formed product (for example glove, fingerstall or condom) is determined by the dipping former. The surface contours of the . dipping formers are continuous and have neither corners nor edges. The surface profile (for example indentations, burls, stretch creases) of the dipping former accurately reproduced in the dip-formed product. Dipping formers should be constructed in such a way that they have high mechanical strength coupled with walls which are as thin as possible. This should ensure that at a low weight the heating and cooling operations required by the process occur rapidly. The wall thickness of dipping formers made from technical porcelain is usually between 3 and 10 mm. The range of wall thicknesses of dipping formers made from SiSiC or SSiC is usually 1 to 5 mm, but it can be, increased up to 10 mm, if necessary, because of the good thermal conductivity. The range of wall thicknesses of dipping formers made from aluminum nitride or beryllium oxide is also between 1 and 10 mm.

It is advantageous for the profiled surface of the dipping formers to have a distinct surface roughness which lies between 3 and 50 μm. This can be achieved by spraying the formers with a slip of the same material prior to sintering.

Depending on the application of the dip-formed product, the surface of the dipping-former often carries in certain areas surface reliefs. These can, as necessary (for example in the case of a glove), increase the security of the grip of the fingertips or reinforce the durability of the cuffs. These reliefs can assume a variety of geometrical designs, for example circular burls, longitudinally oriented creases or pyramid-shaped rounded elevations.

Dip-formed products for medical or other scientific applications (genetic engineering) must have a 100% pass in quality and reliability tests.

Pneumatic quality tests for products produced with the aid of porcelain dipping formers are known It is true that production lines fitted with aluminum dipping formers make in principle electrical testing a possibility; however, because of the sharp-edged- surface damage conferred on the aluminum dipping formers by the production line, these sites cause electrical breakdowns without the dip-formed product in fact being defective. Since the dipping formers made from the electrically conducting materials put forward do not have this drawback, they can be very advantageously employed for electrical testing of the dip-formed products.

In general the test is carried out as follows:

The test voltage is applied between the electrically conducting dipping former and a suitable electrically conducting bath (electrolyte). Should the dip-formed product have in any part of the surface a defect, for example a pore, a small hole, a site of insufficient thickness, then an electrical breakdown occurs. This procedure can be carried out rapidly and can be automated.

There have been numerous attempts in the past to coat dipping formers made from technical porcelain with conducting glazes in order to render them suitable for electrical quality testing. However, no technically satisfactory outcome of these efforts is known.

Aluminum nitride and beryllium oxide do not possess this good electrical conductivity. However, in comparison with SiC materials they have a higher thermal conductivity and can therefore be employed as advantageously as SiSiC and SSic. All the mentioned ceramic materials according to the invention possess a sufficiently high resistance to the thermal shock cycling test to make them suitable for the vinyl gloves manufacturing process.

The physical data of the ceramic materials used are listed in Table 1.

Dipping formers made from SiSiC can be manufactured by the slip-casting process. This process is disclosed, for example, in European Patent 147,478 or British Patent 1,596,303.

To this end an absorbent solid body having a cavity which represents the negative of the dipping former to be made, is produced first. For example, a suspension in water comprising at least two particle size fractions of silicon carbide is then prepared, with or without the addition of carbon, and a binder (mostly sodium carboxymethyl cellulose). This suspension is poured into the cavity of the absorbent solid body. After a waiting period to allow a part of the water to be absorbed, the remainder of the suspension is optionally discharged, the mold is allowed to dry and is then opened. The green silicon carbide body removed from mold is dried in a drying oven and is then silicized at 1400° to 1750° C. under reduced pressure.

TABLE 1

| Physical properties of ceramic materials for dipping formers | | SiSiC | SSiC | AlN | BeO |
|---|---|---|---|---|---|
| Density | [g/cm$^3$] | 3.03–3.10 | 3.05–3.10 | 3.2–3.3 | 2.8–3.0 |
| Flexural strength | [N/mm$^2$] | 250–380 | 350–550 | 170–250 | 280–350 |
| Modulus of elasticity | [N/mm$^2$] | 350–420 | 300–400 | 290–320 | 300–360 |
| Coefficient of thermal expansion (20–1000° C.) | [10$^6$K$^{-1}$] | 5.0 | 4.3 | 5.4 | 8.9 |
| Thermal conductivity | [W/m · K] | 100–150 | 60–150 | 80–220 | 150–300 |
| Electrical resistance | [Ω cm] | 10 | 10 | 10$^{11}$ | 10$^{14}$ |

We claim:

1. A process for making a ceramic dipping former from silicized silicon carbide, comprising:

making an absorbent negative mold of the ceramic dipping former;

preparing a suspension containing at least two particle size fractions of silicon carbide, a binder and water;

pouring said suspension into said absorbent negative mold;

drying said suspension in said absorbent negative mold to make a silicon carbide green body;

opening said absorbent negative mold and removing said silicon carbide green body;

spraying said silicon carbide green body with a slip using said suspension;

further drying said silicone carbide green body in a drying oven; and silicizing said silicon carbide green body at a temperature between approximately 1400° C. to 1750° C. under reduced pressure.

2. The process as claimed in claim 1, wherein said suspension is prepared to further contain carbon.

3. The process as claimed in claim 1, further comprising the step of waiting after pouring said suspension into said absorbent negative mold to allow said absorbent negative mold to absorb water in the suspension and discharging any remaining suspension from said absorbent negative mold after a required green body thickness is achieved.

* * * * *